US008736126B2

(12) United States Patent
Konećný et al.

(10) Patent No.: US 8,736,126 B2
(45) Date of Patent: May 27, 2014

(54) CIRCULAR TRANSFORMER-GENERATOR

(76) Inventors: František Konećný, Ludgeřovice (CS); Jan Konecný, Ludgerovice (CS)

( * ) Notice: Subject to any disclaimer, the term of this patent is extended or adjusted under 35 U.S.C. 154(b) by 415 days.

(21) Appl. No.: 13/133,320

(22) PCT Filed: Dec. 3, 2009

(86) PCT No.: PCT/CZ2009/000145
§ 371 (c)(1),
(2), (4) Date: Jun. 7, 2011

(87) PCT Pub. No.: WO2010/066209
PCT Pub. Date: Jun. 17, 2010

(65) Prior Publication Data
US 2011/0248589 A1    Oct. 13, 2011

(30) Foreign Application Priority Data
Dec. 8, 2008    (CS) .................................... 2008-779

(51) Int. Cl.
*H02K 3/00*    (2006.01)
*H02K 16/00*    (2006.01)
(52) U.S. Cl.
USPC ............................ 310/180; 310/114; 310/266
(58) Field of Classification Search
USPC ....................... 310/144, 266, 14, 180; 290/55
See application file for complete search history.

(56) References Cited

U.S. PATENT DOCUMENTS

| 4,020,412 A | * | 4/1977 | Rioux et al. ................ 323/328 |
| 4,982,128 A | | 1/1991 | McDonald |
| 6,590,312 B1 | * | 7/2003 | Seguchi et al. .............. 310/266 |

(Continued)

FOREIGN PATENT DOCUMENTS

| EP | 1 931 015 A2 | 6/2008 |
| JP | 9-233792 A | 9/1997 |
| KR | 10-2004-0002349 A | 1/2004 |
| WO | WO 9703451 A1 * | 1/1997 .............. H01F 30/10 |
| WO | WO 2008/130139 A2 | 10/2008 |

OTHER PUBLICATIONS

International Search Report (PCT/ISA/210) issued on Aug. 3, 2010, by Czech Republic Patent Office as the International Searching Authority for International Application No. PCT/CZ2009/000145.

*Primary Examiner* — Tran Nguyen
(74) *Attorney, Agent, or Firm* — Buchanan Ingersoll & Rooney PC

(57) ABSTRACT

The Circular transformer-generator is a rotational electrical machine that joins creation of sinusoidal voltage and current with the transformation phenomenon or mutual inductivity of the individually wound stator coils. The Circular transformer-generator consists of the stator part that has a number of the inner pole extensions, and a number of the outer pole extensions with spaces between them for the individual stator windings, and of the double rotor assembly that contains the inner body and the outer body with the magnetic or electro-magnetic poles that during rotor rotation supply induction to the stator assembly or the individual axially wound stator coils. The axially wound coils of the stator are connected to the Circular transformer-generator output, and at the same time are tied (act upon each other) by their mutual induction, during which time also the transformation coil ratio can be utilized. Resistance against delivered torque of the Circular transformer-generator is much smaller than that of conventional synchronous rotational electric machines.

11 Claims, 8 Drawing Sheets

(56) References Cited

U.S. PATENT DOCUMENTS

Figure 1:
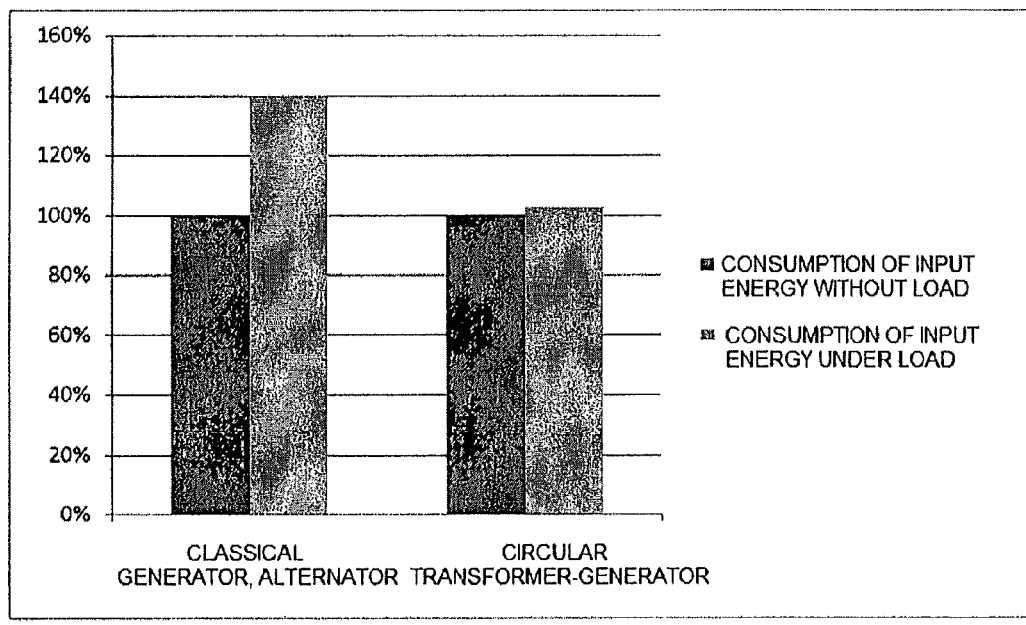

| | | |
|---|---|---|
| 6,768,237 B1* | 7/2004 | Schroedl .................. 310/114 |
| 7,154,192 B2* | 12/2006 | Jansen et al. ................ 290/55 |
| 2002/0047418 A1* | 4/2002 | Seguchi et al. ............ 310/114 |
| 2005/0110365 A1* | 5/2005 | Shkondin .................. 310/266 |
| 2005/0264121 A1 | 12/2005 | Yajima et al. |
| 2008/0174194 A1* | 7/2008 | Qu et al. .................... 310/114 |
| 2010/0139999 A1 | 6/2010 | Park |

* cited by examiner

CIRCULAR TRANSFORMER-GENERATOR

FIELD OF THE INVENTION

The presented invention pertains to a rotational electrical machine—a Circular transformer-generator that is driven by outside mechanical energy, which is transformed to electric power.

BACKGROUND OF THE INVENTION

Overwhelming majority of electrical energy is currently produced on the principle of generation of sinusoidal voltage and current, using synchronous electrical machines, like generators or alternators that are driven by mechanical energy or torque. Common types of these synchronous electrical machines contain a stator and a rotor. The stator contains a number of stator coils, into which voltage is induced thanks to rotating magnetic poles of the rotor, in dependence on the amount of rotor excitation, speed of turning, and number of coils in the stator winding, etc. The rotor can also be made of permanent magnet poles or extensions with field coils. Magnetic forces are thus created inside the classical electrical generators that by their mutual effects act against the input mechanical energy torque, and thus cause ineffective transformation of mechanical energy into electrical one. There are approximately 30-40% losses in existing generators, while the most effective generators produce under load about 60-70% of electrical energy out of 100% of energy delivered by the torque. Significant losses are thus generated and a significant amount of primary energy resources is wasted.

This creates a need to produce electrical energy more efficiently and find solutions that minimize losses during this energy transformation. Such possibility is provided by invention of the Circular transformer-generator presented here.

There are also solutions known according to patents KR 2004 0002349 A and JP 9 233792 A, which correspond only in the element of a double rotor. In those cases double rotors including stators constructionaly differ from the solution presented here and they don't contain elements of the solution of the Circular transformer-generator.

A known solution is also WO 2008/130139 A2, however here the winding of the stator is solved in a usual way and therefore in the stator no transformation ratio appears and it's not possible to reach results, which offers the solution of the Circular transformer-generator.

Furthermore there are solutions U.S. Pat. No. 4,982,128A or EP1931015A2 known, which have a double stator or a stator with inner and outer windings. But in those and similar cases electric energy can't be generated parallelly with the appearance of a mutual magnetic inductance between independent coils of the stator respectively an appearance of a transformation ratio between the coils of the stator, as is in the case of the Circular transformer-generator.

SUMMARY OF THE INVENTION

The above mentioned disadvantages of the existing design are eliminated, and higher efficiency is achieved by the construction and wiring according to the invention whose principle lies in the fact that the Circular transformer-generator contains a stator that is provided with a number of inner and outer pole extensions, and a double rotor that has a number of poles on the inner and outer part of the rotor, while the stator contains the usually circular stator core, on which there is a number of individual stator coils wound axially in the spaces between each two inner pole extensions of the stator, and each two outer pole extensions of the stator, where minimally two individual stator coils, designed to neighbor each other, are tied by their mutual induction and outputs of the individual stator coils are interconnected and brought to the Circular transformer-generator output, from which one-phase alternating current can be drawn. The double rotor contains the same number of permanent or electric magnet poles located on the inner body of the double rotor, as the number of inner stator pole extensions, and the same number of permanent or electric magnet poles placed on the inner side of the outer double rotor body, as is the number of the inner stator pole extensions. Each north pole placed on the inner body of the double rotor is situated against each north pole placed on the inner side of the outer body of the double rotor, and each south pole placed on the inner body of the double rotor is situated against each south pole placed on the inner side of the outer body of the double rotor.

It is advantageous if the transformer-generator contains the stator, where the number of pole extensions is equal to $2N_0+2$, where $N_0$ is a positive integer, as well as when the transformer-generator double rotor contains $2N_0+2$ poles made out of permanent or electric magnets, or their combination. It is also advantageous if the total number of the stator pole extensions is equal to the total number of the double rotor pole extensions.

It is further advantageous that the double rotor made out of permanent or electric magnets, or their combination has a number of alternately placed south and north poles, or that the neighboring poles have unlike polarities.

It is also possible that at least one pair of individual axially wound coils on the stator core would be relatively the same, would have the same number of loops, and relatively the same inner resistance. In order to secure needed parameters, each odd numbered axially wound coil can be parametrically different from each evenly numbered one. Then each odd numbered coil has a different number of loops and different inner resistance than each even numbered one and vice versa.

Another advantage of this design is the possibility to change parameters using serial, parallel, or combination of individual wirings of odd or even numbered axially wound stator coils, or by using serial, parallel, or combination wirings of the odd and even numbered axially wound stator coils with the same polarity of output sinusoidal induced voltage and current.

Disadvantages of the current generator design are eliminated, and the higher efficiency transformation of mechanical energy to electrical one is achieved by the design and wiring of the rotational electrical machine according to the presented invention, whose principle is in the fact that this rotational electrical machine uses a new circular-parallel way of induced magnetic current passage that lowers the total induced magnetic field force that acts against rotation of the rotor. The classical generators cannot achieve this due to their design. The invention presented here also presents new possibilities of setting parameters thanks to its design and the way of wiring. The rotational electrical machine consists of a stator and a double rotor, where the stator contains the usually circular stator core, with a number of individual stator coils wound in spaces between each two inner stator pole extensions and each two outer stator pole extensions, and with inductivity supplied minimally to the two individual axially wound stator coils as a consequence of magnetic or electromagnetic induction of double rotor poles, and at the same time minimally two individual stator coils designed to neighbor each other affecting each other by their mutual inductivity with transformation phenomenon occurring between them.

Outputs of these individually wound stator coils are interconnected and taken to the output of the electrical machine in the way that enables to draw one-phase alternating current and voltage.

There are at least two axial coils wound on the stator core. They are tied to each other by mutual inductivity, transformation phenomenon is thus created, and also transformation ratio can be utilized.

The double rotor is firmly attached to a shaft that transfers torque to the Circular transformer-generator assembly.

The design of Circular transformer-generator or rotational electrical machine that is presented here provides more efficient transformation of mechanical energy to electrical one, since the Circular transformer-generator under load has much lower resistance against the input torque, than is the case with classical synchronous rotational machines.

The Circular transformer-generator has a large potential to substitute conventionally used alternators in the automobile industry and also various types of electrical generators in use today.

DESCRIPTIONS OF THE DRAWINGS

FIG. 1—Graph of input energy consumption of the classical generator and the Circular transformer-generator.

Figure 2:
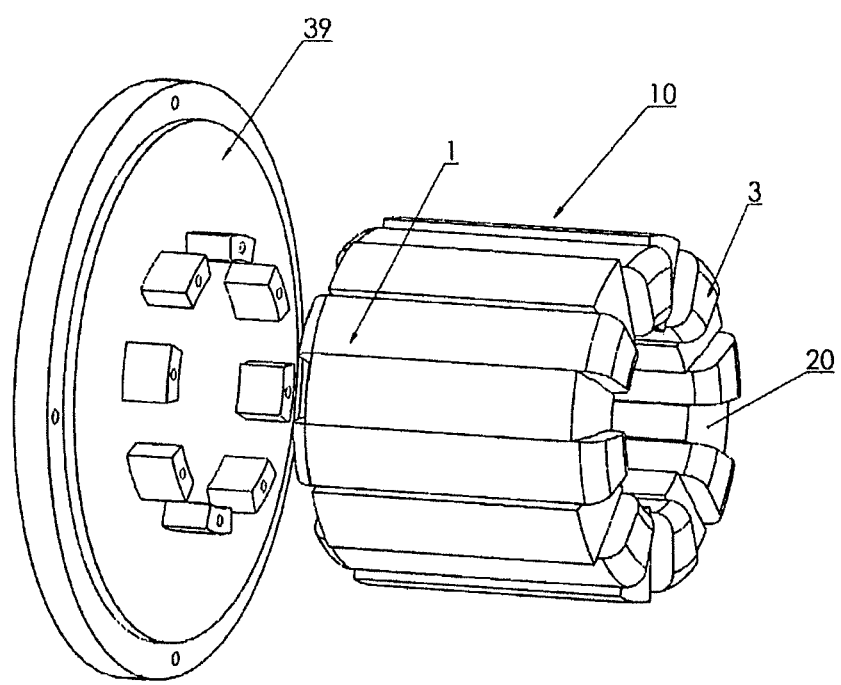

FIG. 2—The stator assembly containing a stator core, inner and outer pole extensions, individual axially wound coils and a stator base.

Figure 3:
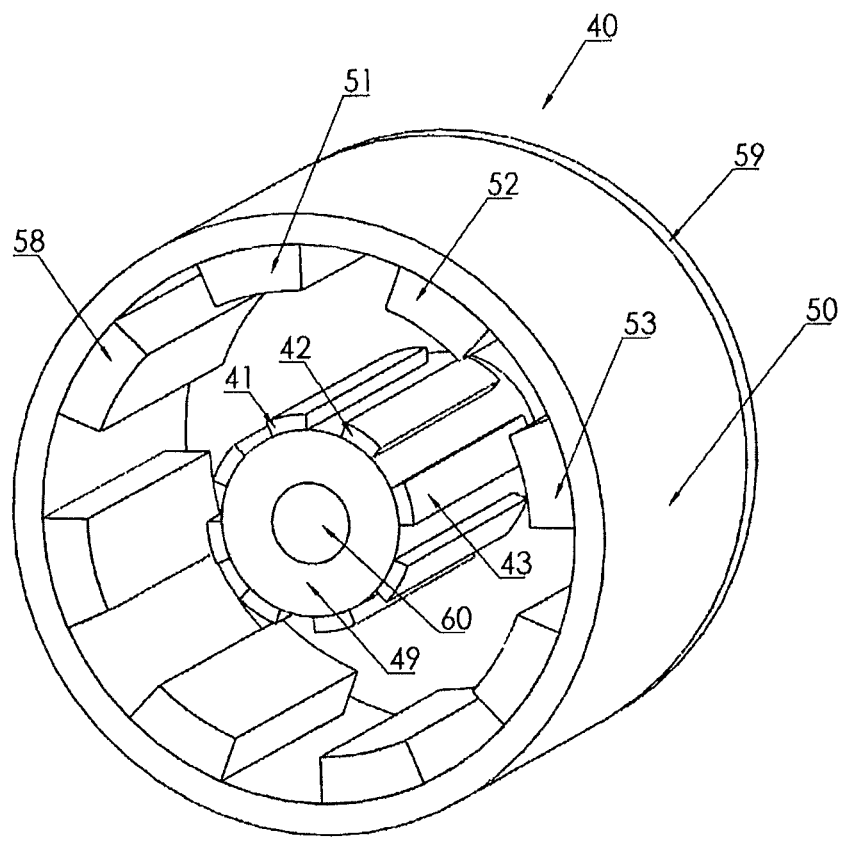

FIG. 3—The double rotor assembly containing the outer and inner rotor body with permanent or electric magnet poles, a rotor base and a rotor shaft.

Figure 4:
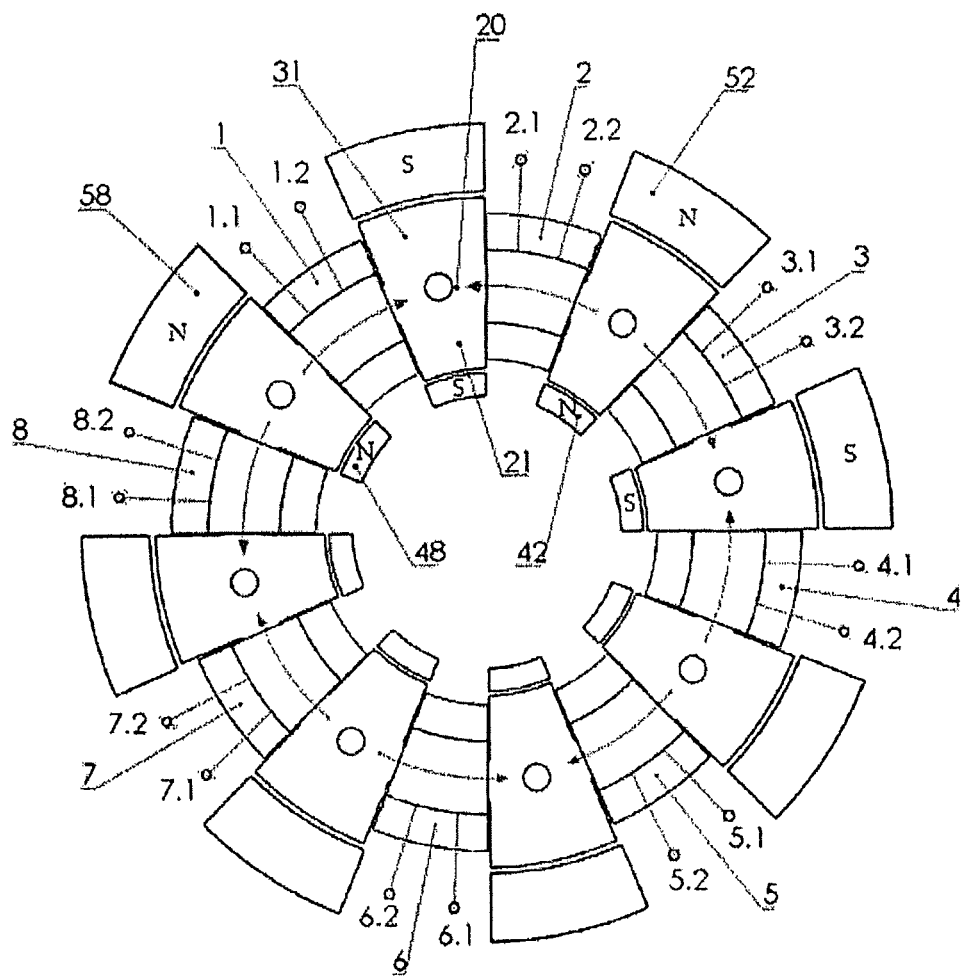

FIG. 4—Schematical illustration of double rotor poles, stator assembly with inner and outer pole extensions, and individual axially wound stator coils.

Figure 5:
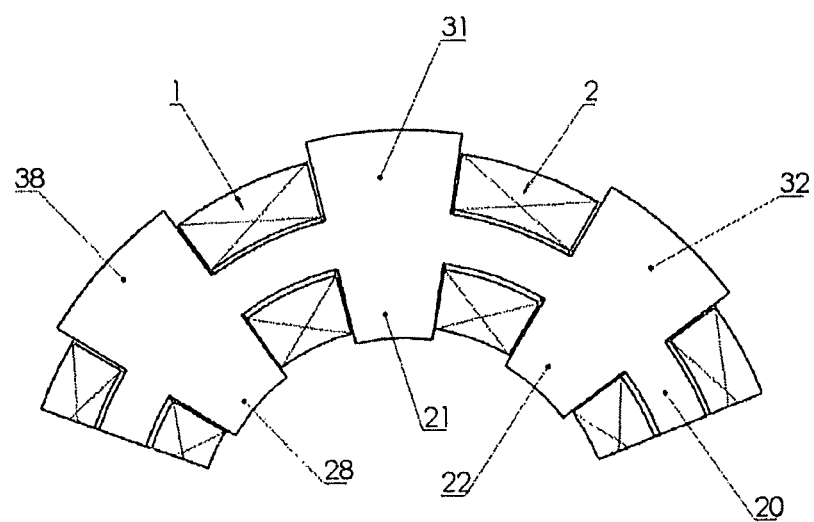
Figure 6:
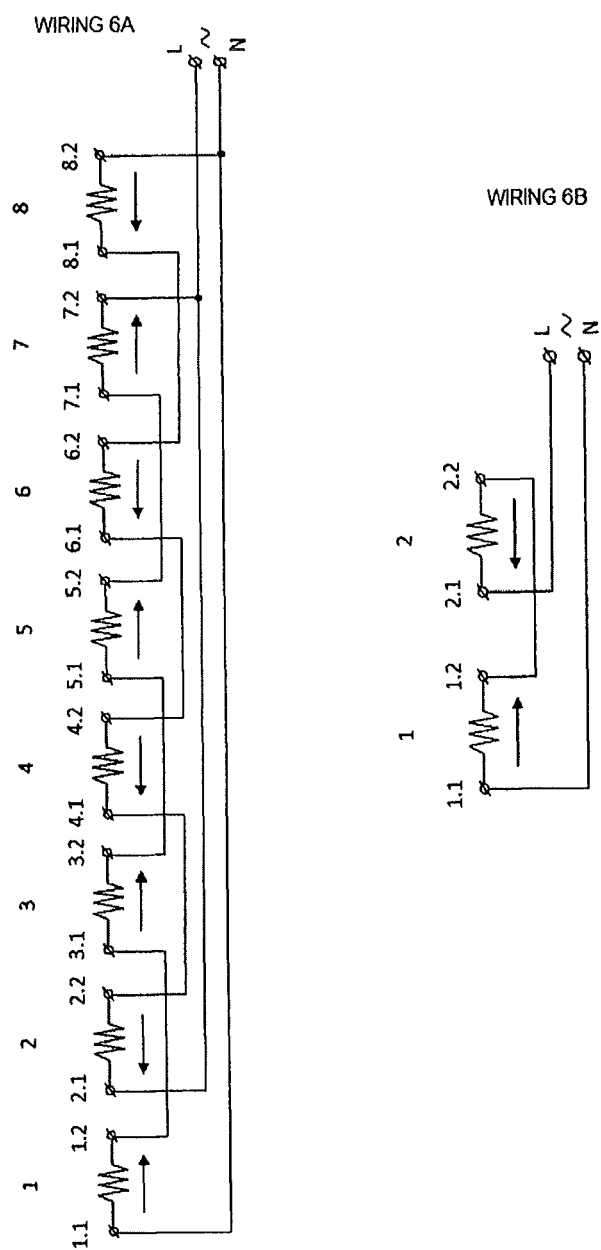
Figure 7:
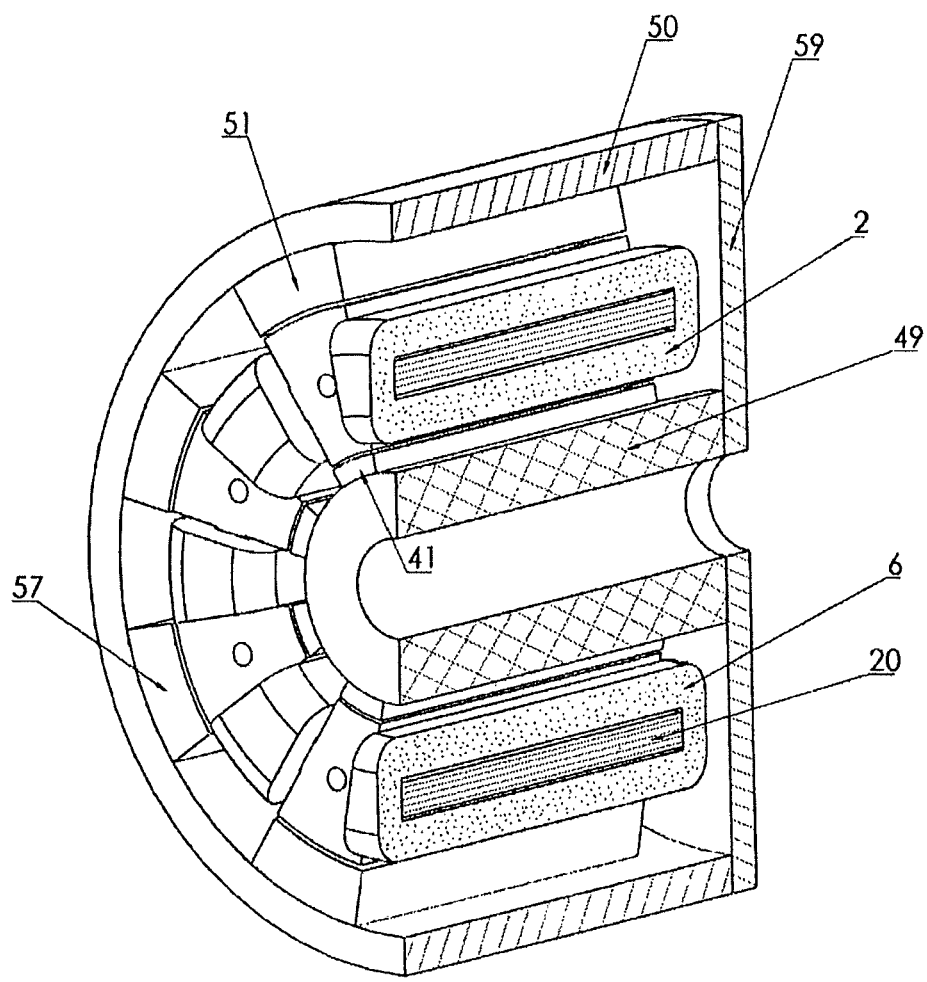
Figure 8:
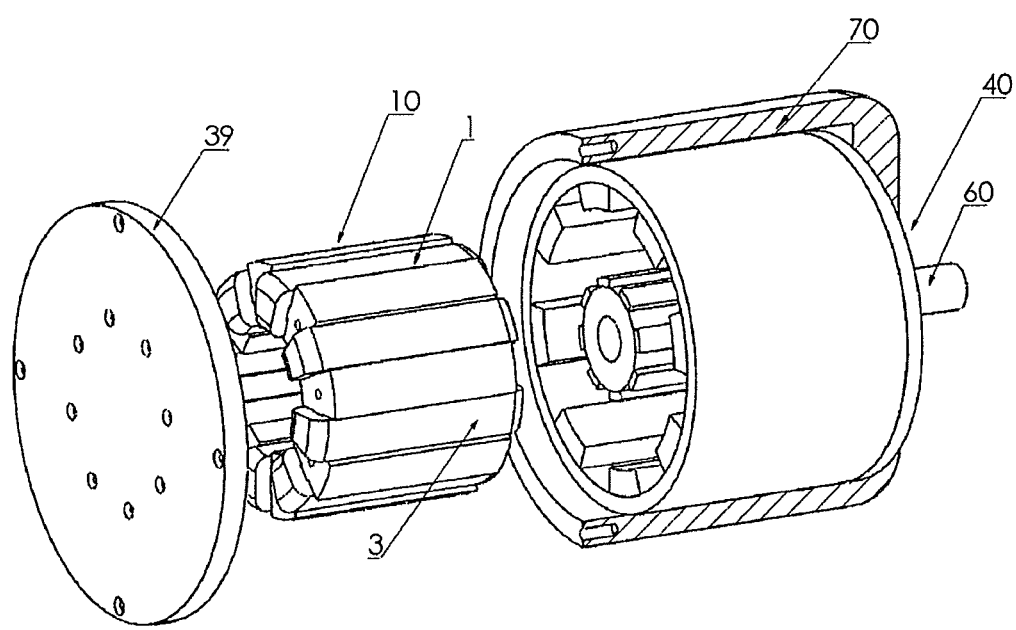

FIG. 5—Cutout of stator assembly.
FIG. 6—Examples of stator coil wiring.
FIG. 7—Profile of double rotor and stator assemblies.
FIG. 8—Expanded view of a Circular transformer-generator.

DESCRIPTION OF PARTS 1-8—individual axially wound stator coils
1.1-8.1—beginnings of individual axially wound stator coils
1.2-8.2—endings of individual axially wound stator coils
10—stator (stator assembly)
20—stator core (stator coil cores)
21-28—inner stator pole extensions
31-38—outer stator pole extensions
39—stator base
40—double rotor (double rotor assembly)
41-48—permanent or electrical magnet poles of the rotor inner body
49—rotor inner body
50—rotor outer body
51-58—permanent or electrical magnet poles of the rotor outer body
59—double rotor base
60—shaft
70—Circular transformer-generator body cover

EXAMPLES OF INVENTION IMPLEMENTATION

FIG. 1 shows percentual difference between consumed mechanical energy of the classic synchronous generator without load and under load, and the same for the Circular transformer-generator. It is apparent from the graph that the Circular transformer-generator under load uses significantly less input energy supplied by torque than a classical generator.

FIG. 2 shows the transformer-generator stator assembly 10 that contains the stator 10 base 39 that is firmly connected to the stator core 20 when folded. The stator core 20 contains a number of inner pole extensions 21-28 situated towards the middle of stator core 20, and the same number of opposite outer pole extensions 31-38 situated in the direction away from the stator core 20, and a number of individual stator windings 1-8 wound axially onto the stator core 20 in the opposite spaces between each two inner pole extensions 21-28 and each two outer pole extensions 31-38.

FIG. 3 shows the double rotor assembly 40 that contains inner poles 41-48 made out of permanent or electrical magnets placed on the inner body 49 of the double rotor 40 that are located against the same number of outer poles 51-58 made out of permanent or electric magnets placed on the outer body 50 of the double rotor 40. The inner body 49 of the double rotor 40 and the outer body 50 of the rotor 40 are made from magnetically conductive material, and are firmly connected to the rotor base 59 that is made from magnetically non-conductive material.

The double rotor assembly 40 is firmly connected to the shaft 60, across which mechanical energy torque is transferred to the Circular transformer-generator.

FIG. 4 schematically shows position of the stator assembly 10 with individually wound coils 1-8 and positions of the inner poles 41-48 and outer poles 51-58 of the double rotor 40. Individually axially wound stator 10 coils 1-8 show outputs 1.1-8.1 and 1.2-8.2 of the individual coils 1-8. Markings 1.1 to 8.1 show beginnings of individual coils 1-8 of the stator 10, markings 1.2 to 8.2 show endings of the individual coils 1-8 of the stator 10. Radially oriented arrows show direction of magnetic flux flowing in the stator 10 within one sinusoidal half-wave. The magnetic flux directions correspond to induced voltage and current of the individually wound coils 1-8 of the stator 10. Coils 1 and 2 create a pair of mutually affected coils, as well as further pairs of neighboring coils 2 and 3, 3 and 4 etc. Pairs of the coils 1-8 are interconnected to have induced voltage and current in agreement and added together, whereas their magnetic flows act against each other within one sinusoidal half-wave. When the double rotor assembly 40 turns in relation to the stator assembly 10, and its pole extensions 21 to 28 and 31 to 38, change of polarity of the magnetic flow that goes through the stator core 20 (the core of individually wound coils 1-8 of the stator 10) occurs.

The individual axially wound coils 1-8 can have the same number of loops and the same inner resistance, but at the same time the odd and even numbered coils 1-8 of the stator 10 can have different number of loops and a different inner resistance. In both cases the neighboring individually wound coils 1.2; 2.3; 3.4; etc. create pairs within one sinusoidal half-wave. If the individually wound coils 1-8 of the stator 10 are the same, their absolute identity is nevertheless relative, but they create the transformation ratio 1:1; in case the coils 1-8 are different, they in pairs create transformation ratios like 1:2, etc. When the Circular transformer-generator is working, then the different coils 1-8 generate different values of voltage and current, which, due to mutual connection, have the same polarity of sinusoidal curve of electrical energy, and in the framework of transformation phenomenon the parameters of coils 1-8 can be used for dimensioning of source parameters.

The north poles 42, 44, 46, 48 of permanent or electrical magnets on the inner body 49 of the double rotor 40 are placed opposite the north poles 52, 54, 56, 58 of permanent or electrical magnets on the outer body 50 of the double rotor 40, and the south poles 41, 43, 45, 47 of permanent or electrical magnets on the inner body 49 of the double rotor 40 are situated opposite the south poles 51, 53, 55, 57 of permanent or electrical magnets on the outer body 50 of the double rotor 40.

In one sinusoidal half-wave thus occurs generation of opposite voltage and current polarity in the individual axially wound neighboring coils. Considering possibilities and way of their interconnection these opposite polarities are in phase at the output. Each individual axially wound coil is, by its inductivity, tied to each neighboring individual axially wound coil. A transformation phenomenon is seen here.

FIG. 5 shows a cutout of the stator 10 together with individually wound coils 1-8. The axially wound coils 1-8 are wound on a stator core 20. The stator core 20 contains inner pole extensions 21-28 situated towards the middle of stator 10, and opposite outer pole extensions 31-38 situated at the outside of the stator 10.

In space between the outer pole extensions 31-38 and the inner pole extensions 21-28 of the stator 10 are individually wound coils 1-8. The opposite inner and outer grooves that exist between the pole extensions 21 and 22, and 31 and 32, of the stator 10 are then coincidental as far as their volume.

FIG. 6 shows an example of possible wiring of the individual axially wound coils 1-8 of the stator 10. The wiring 6A shows serial-parallel connection of eight coils 1-8 and the wiring 6B is an example of the serial connection of two coils 1-2.

It follows from the following description that at least two coils 1-8 that mutually affect each other, and are wound on the same circular stator core 20, influence each other by mutual inductivity, as shown by the arrows in the FIG. 6; the transformation phenomenon occurs at the same time. Thanks to the different ways of connecting, it is possible to dimension the Circular transformer-generator to required parameters.

In the serial-parallel wiring of eight individual stator coils 1-8, as is shown on the wiring 6A, where we are considering the eight-pole Circular transformer-generator:

the end 1.2 of the coil 1 is connected to the beginning 3.1 of the coil 3; the end 3.2 of the coil 3 is connected to the beginning 5.1 of the coil 5; the end 5.2 of the coil 5 is connected to the beginning 7.1 of the coil 7; the end 7.2 of the coil 7 is connected to the output terminal L;

the end 2.2 of the coil 2 is connected to the beginning 4.1 of the coil 4; the end 4.2 of the coil 4 is connected to the beginning 6.1 of the coil 6; the end 6.2 of the coil 6 is connected to the beginning 8.1 of the coil 8; the end 8.2 of the coil 8 is connected to the output terminal N;

the beginning 2.1 of the coil 2 is connected to the end 7.2 of the coil 7 and brought out to the output terminal L;

the beginning 1.1 of the coil 1 is connected to the end 8.2 of the coil 8 and brought out to the output terminal N;

In the serial connection of two individual stator coils 1-2 according to 6B, where we have a two-pole Circular transformer-generator, the end 1.2 of the coil 1 is connected to the end 2.2 of the coil 2; the beginning 2.1 of the coil 2 is connected to the phase conductor L and the beginning 1.1 of the coil 1 is connected to the work conductor N.

Any interconnection of the individual stator coils 1-8 in the amount $2N_0+2$, where $N_0$ is a positive integer, is such that two neighboring coils, for example 1 and 2, are working in phase and their voltages add together.

FIG. 7 shows a cross-section of the double rotor 40 and the stator 10 with the individually wound coils 1-8 and the pole extensions 21-28, and 31-38. The inner body 49 of the double rotor 40, and the outer body 50 of the double rotor 40 are firmly attached to the rotor base 59, and both of them contain the poles 41-48, and 51-58 made out of permanent or electric magnets. The individually wound axial coils 1-8 of the stator 10 are wound on the stator core 20.

FIG. 8 shows the expanded view of the Circular transformer-generator with the main parts, like the double rotor assembly 40 that is firmly connected to the shaft 60; the stator base 39 that is during folded condition of Circular transformer-generator firmly connected to the stator 10, and the cover 70.

From the above it is apparent that the presented Circular transformer-generator invention is not limited by proportions of the drawn design, it is not limited by the presented number of pole extensions and their shapes, nor it is limited by the presented number of coils. The presented invention can be freely modified in the framework of the attached patent claims, since it represents construction principles that need to be kept in order to achieve the highly effective transformation of mechanical energy to electrical one or to achieve effective production of electrical energy.

The invention claimed is:

1. A Circular transformer-generator containing a stator with a number of inner and outer pole extensions and a double rotor that is provided by a number of poles on the inner and outer rotors and comprising:

the stator that contains a circular stator core with a number of axially wound individual stator coils wound in the spaces between each two inner pole extensions of the stator core and each two outer pole extensions of the one stator core, wherein at least two individual coils of the stator designed to neighbor each other are tied by mutual inductivity with transformation ratio, wherein outputs of the individual stator coils are interconnected and brought out to the output of the Circular transformer-generator, wherein one-phase alternating current can be drawn, the double rotor contains a number of poles made out of permanent or electric magnets that are placed on the inner body of the double rotor is the same as the number of the inner pole extensions of the stator, and a number of poles made out of permanent or electric magnets placed on the inner side of outer body of the double rotor is the same as the number of the outer pole extensions of the stator, wherein each north pole located on the inner body of the double rotor is situated against each north pole located on the inner side of the outer body of the double rotor, and wherein each south pole placed on the inner body of the double rotor is situated against each south pole placed on the inner side of outer body of the double rotor.

2. The Circular transformer-generator as recited in claim 1, wherein the stator is such that the number of pole extensions of the stator is $2N_0+2$, where $N_0$ is a positive integer.

3. The Circular transformer-generator as recited in claim 1, wherein the double rotor is such that the number of poles made out of permanent magnets, electric magnets and combinations thereof, is $2N_0+2$, where $N_0$ is a positive integer.

4. The Circular transformer-generator as recited in claim 1, wherein the stator is such that the total number of pole extensions of the stator is coincidental with the total number of poles of the double rotor.

5. The Circular transformer-generator as recited in claim 1, wherein the double rotor has a number of alternately placed south and north poles made out of permanent magnets, electric magnets and combinations thereof.

6. The Circular transformer-generator as recited in claim 1, wherein the double rotor comprises a base made of a magnetically non-conductive material firmly attached to the inner body of the double rotor and the outer body of the double rotor that are made of a magnetically conductive material.

7. The Circular transformer-generator as recited in claim 1, wherein the individual axially wound coils on the stator core, comprise at least one pair that are relatively coincidental, have the same number of turns, and relatively coincidental inner resistance.

8. The Circular transformer-generator as recited in claim 1, wherein the individual axially wound coils on the stator core, comprise at least on pair where each odd numbered coil is parametrically different from each even numbered coil, so each odd numbered coil has a different number of turns, and a different inner resistance than each even numbered coil.

9. The Circular transformer-generator as recited in claim 1, further comprising a serial connection of the axially wound coils of the stator connected in the same polarity of sinusoidal curve of the output induced voltage and current.

10. The Circular transformer-generator as recited in claim 1, further comprising a parallel connection of the axially wound coils of the stator connected in the same polarity of sinusoidal curve of the output induced voltage and current.

11. The Circular transformer-generator as recited in claim 1, further comprising a combination of serial and parallel connections of the axially wound coils of the stator connected in the same polarity of alternating curve of the output induced voltage and current.

* * * * *